US007158540B1

(12) United States Patent
Stiles et al.

(10) Patent No.: US 7,158,540 B1
(45) Date of Patent: Jan. 2, 2007

(54) RING NETWORK ELEMENT AND THE RING NETWORK ARCHITECTURES IT ENABLES

(75) Inventors: David R. Stiles, Los Gatos, CA (US); Siegfried Luft, Vancouver (CA); Lawrence Ong, Coquitlam (CA); James C. Pang, Vancouver (CA)

(73) Assignee: Redback Networks, Inc., San Jose, CA (US)

( * ) Notice: Subject to any disclaimer, the term of this patent is extended or adjusted under 35 U.S.C. 154(b) by 1000 days.

(21) Appl. No.: 09/823,871

(22) Filed: Mar. 30, 2001

(51) Int. Cl.
*H04J 3/00* (2006.01)

(52) U.S. Cl. .................. 370/498; 370/404; 370/907

(58) Field of Classification Search ............. 370/236.2, 370/395.51, 907
See application file for complete search history.

(56) References Cited

U.S. PATENT DOCUMENTS

| | | | |
|---|---|---|---|
| 5,159,595 A | | 10/1992 | Flanagan et al. |
| 5,412,652 A | * | 5/1995 | Lu .............................. 370/223 |
| 5,826,038 A | | 10/1998 | Nakazumi |
| 6,122,250 A | | 9/2000 | Taniguchi |
| 6,188,667 B1 | * | 2/2001 | Roberts et al. .............. 370/219 |
| 6,205,158 B1 | * | 3/2001 | Martin et al. ................ 370/541 |
| 6,587,470 B1 | * | 7/2003 | Elliot et al. .................. 370/404 |
| 6,657,969 B1 | * | 12/2003 | Neuendorff et al. ........ 370/245 |
| 6,754,174 B1 | * | 6/2004 | Ben-Zur et al. ............. 370/225 |
| 6,999,479 B1 | * | 2/2006 | Jha ............................ 370/535 |
| 2001/0033570 A1 | * | 10/2001 | Makam et al. .............. 370/373 |
| 2002/0135835 A1 | * | 9/2002 | Lauder et al. .............. 359/124 |
| 2005/0013248 A1 | * | 1/2005 | Mekkittikul et al. ........ 370/232 |

OTHER PUBLICATIONS

Redback Networks SmartEdge 800, Multi-service optical platform for metropolitan networks (6 pgs).
NetOp Network and Node Manager Operations Guide, Release 1.2, Part No. 220-0178-01, Order No. TPSW-NOM 1.2, Redback Networks (119 pgs).

* cited by examiner

*Primary Examiner*—Seema S. Rao
*Assistant Examiner*—Michael J. Moore, Jr.
(74) *Attorney, Agent, or Firm*—Blakely, Sokoloff, Taylor & Zafman LLP

(57) ABSTRACT

A ring network element and the ring network architectures it enables. According to one embodiment of the invention, a single network element includes a full TDM cross-connect and a multiple ring unit. The full TDM cross-connect is coupled to every line card slot in the single network element with the same amount of bandwidth connection. In addition, the full TDM cross-connect is programmable on an STS-1 basis. The multiple ring unit allows for the simultaneous support of multiple TDM rings.

53 Claims, 10 Drawing Sheets

```
┌─────────────────────────────────────────────┐
│ INSTALL MULTIPLE ACCESS CONNECTIONS TO      │
│ THE MULTIPLEXING RING NETWORK ELEMENT       │
│ SUCH THAT THE SUM OF THE BANDWIDTH OF       │
│ THE ACCESS CONNECTIONS IS SUBSTANTIALLY     │
│ GREATER THAN THE COLLECTOR RING             │
│ BANDWIDTH, BUT THAT THE SUM OF THE          │
│ CURRENT BANDWIDTH REQUIREMENTS OF THE       │
│ CUSTOMERS ON THE ACCESS CONNECTIONS IS      │
│ LESS THAN THE AVAILABLE BANDWIDTH ON        │
│ THE COLLECTOR RING                    400   │
└─────────────────────────────────────────────┘
                       │
                       ▼
┌─────────────────────────────────────────────┐
│ GROOM TRAFFIC TO THE COLLECTOR RING BY      │
│ PROVISIONING ADD/DROPS FROM THE             │
│ COLLECTOR RING TO THE ACCESS                │
│ CONNECTIONS TO MEET THE CURRENT             │
│ REQUIREMENTS OF CUSTOMERS ON THE            │
│ ACCESS CONNECTIONS                    410   │
└─────────────────────────────────────────────┘
                       │
                       ▼
┌─────────────────────────────────────────────┐
│ OVER TIME, INCREASE THE ADD/DROP            │
│ BANDWIDTH FROM THE COLLECTOR RING TO        │
│ DIFFERENT ONES OF THE ACCESS                │
│ CONNECTIONS ON AN AS NEEDED BASIS           │
│ AND/OR ADD ADDITIONAL ACCESS                │
│ CONNECTIONS                           420   │
└─────────────────────────────────────────────┘
                       │
                       ▼
┌─────────────────────────────────────────────┐
│ IF THE SUM OF THE BANDWIDTH                 │
│ REQUIREMENTS OF THE ACCESS CONNECTIONS      │
│ INCREASES BEYOND THE AVAILABLE              │
│ BANDWIDTH ON THE COLLECTOR RING,            │
│ UPGRADE THE BANDWIDTH ON THE                │
│ COLLECTOR RING                        430   │
└─────────────────────────────────────────────┘
```

RING NETWORK ELEMENT AND THE RING NETWORK ARCHITECTURES IT ENABLES

CROSS-REFERENCE TO RELATED APPLICATIONS

Not applicable.

BACKGROUND OF THE INVENTION

1. Field of the Invention

This invention relates to communication networks. More specifically, the present invention relates to communication over optical networks.

2. Background of the Invention

Various topologies can be used in a network. One such network topology is a ring. Different types of transport technologies can be used on a ring network. One class of these transport technologies relies on multiplexing (e.g., time division multiplexing (TDM), wave division multiplexing (WDM), dense wave division multiplexing (DWDM), etc.).

An optical standard such as Synchronous Optical Network (SONET) or Synchronous Digital Hierarchy (SDH) in conjunction with a multiplexing scheme is used to deliver various rates of traffic over high-speed optical fiber. SONET/SDH is a transmission standard for optical networks that corresponds to the physical layer of the open standards institutes (OSI) network model. One of the protection schemes for SONET/SDH in a ring network involves automatic protection switching (APS) in a bi-directional line switched ring (BLSR) architecture. There are different types of BLSR, including two fiber and four fiber. In addition to BLSR, there is also a unidirectional path switched ring (UPSR) architecture.

FIG. 1 illustrates a type of multiplexing ring network element and the typical network architectures within which it is used according to the prior art. In particular, FIG. 1 illustrates the multiplexing ring network elements 110, 150 and 160. Each of these ring network elements includes a cross-connect (114, 154 and 164, respectively). Each of these cross-connects is connected to a number of line card slots within the chassis of the network element. It should be noted that the different slots within a network element are connected to the cross connect with either a low-speed or a high-speed bandwidth connection. In particular, there are at most 4 line card slots connected to the cross-connect with high-speed bandwidth connections (each of the rest of the line card slots are connected to the cross-connect with low-speed bandwidth connections). The insertion of the appropriate line card into one of these slot forms an interface. For instance, the cross-connect 114 of the network element 110 is connected to each of the linear interfaces 112A through 112I with a low speed connection, while the cross-connect 114 is connected to each of the ring up to 4 interfaces 116A–116D with a high-speed connection. The network elements are designed this way because the low speed interfaces are used for providing linear connections, whereas the high-speed interfaces are used for connecting the network element to a ring.

Certain network elements used for the purposes shown in FIG. 1 have a simple add-drop MUX instead of a cross-connect. However, this design suffers from a well-known fragmentation problem regarding the time slots on the rings. This fragmentation problem was the motivation to include a cross-connect in the network elements of FIG. 1. Specifically, the cross-connect of FIG. 1 is used to shift traffic received by a network element on certain incoming time slots of the ring to different outgoing time slots of that ring (referred to as time slot interchanges) to reduce or eliminate fragmentation.

These network elements are typically used in two different types of network architectures: 1) an access network architecture; and 2) a hubbed network office architecture. In the example of FIG. 1, the network element 110 is being used in an access network architecture. Specifically, each of the linear interfaces 112A–112I is connected to one or more pieces of customer premise equipment 100A–100K (e.g., using one or a combination of T1, T3, DS1, DS3, etc.). In contrast, the ring interfaces 116A–116D are connected to a ring 145 that includes a network element 140 and the network element 150.

The ring 145 is often referred to as a trunk or collector ring and consists of either two or four fibers. The linear connections to the customer premise equipment are referred to as tributaries of the collector ring. The tributaries are used to add and drop traffic between the ring 145 and the different pieces of customer premise equipment. The sum of the bandwidth to the linear interfaces typically does not exceed the sum of the bandwidth to the ring interfaces.

This access network architecture is typically used in a metro setting. In particular, the pieces of customer premise equipment 100A–100K typically reside in different office buildings. This customer premise equipment provides metro access to a metro collector ring (e.g., the ring 145). While the ring 145 has significantly greater bandwidth than any of the connections to the customer premise equipment, the sum of the bandwidth required for the actual traffic to and from the customer premise equipment cannot exceed the bandwidth available on the ring 145. This is why the sum of the bandwidth connecting the cross-connect 114 to the linear interfaces 112A–112I typically does not exceed the sum of the bandwidth from the cross-connect 114 to the ring interfaces 116A–116D.

In the example of FIG. 1, the network elements 150 and 160 are being used in a hubbed network office architecture. A hubbed network office is a location where multiple collector rings are interconnected. The network elements 150 and 160 have the same architecture as the network element 110. Specifically, the network elements 150 and 160 have ring interfaces 156A–156D and 166A–166D respectively connecting the network elements to the rings 145 and 165. These ring interfaces have a high-speed bandwidth connection to their respective cross-connects. In addition, the network elements 150 and 160 respectively include linear interfaces 152A–152I and 162A–162I that are each connected to their respective cross-connects with low bandwidth connections.

The rings 145 and 165 are interconnected by one or more linear connections between the network elements 150 and 160 using the linear interfaces 152A–152I and 162A–162I. This interconnection allows for the passing of traffic between the rings. For example, traffic from the ring 145 may be "dropped" from ring interfaces 156A–156D to tributary interfaces 152A–152I, and then "added" from tributary interfaces 166A–166D to the ring 165.

The architecture of the network elements and the network architectures in FIG. 1 suffer from several limitations. With respect to the access network architecture, it is relevant to understand the manner in which the linear connections are selected, deployed, and provisioned. Specifically, when connecting a piece of customer premise equipment to the ring 145, a selection must be made as to what amount of bandwidth connection should be deployed. This decision is based upon an estimate of the current and future bandwidth needs. For the network operator with many customers, a per customer decision must be made for how much each customer or area will grow. Once the prediction is made, the connection must be deployed (e.g., by tearing up the road between the network element 110 and the customer premise equipment). Once the connection to the customer premise is deployed and provisioned, the network operator begins to collect revenue based upon the bandwidth of that line.

When one of the above predictions is wrong and/or enough time has passed, it is not uncommon for a higher bandwidth connection to need to be deployed. When this happens, the basic steps listed above are again performed. This process is expensive and time consuming for several reasons. Specifically, it takes a long time and it is expensive to re-deploy a higher bandwidth line (e.g., digging up the road again). In addition, the increased price for the higher bandwidth connection cannot be charged by the network owner until the higher bandwidth connection is established. Thus, the time it takes to deploy the line reduces the revenue for the network owner. Effectively, a less expensive network element (due to the lower speed bandwidth connections between the linear interfaces and the cross-connect, as well as the less complex cross-connect required as a result) has resulted in a greater operating cost (e.g., the cost of deploying higher bandwidth connections, as well as the loss of the higher billing rate for the increased bandwidth connections while they are being installed).

With respect to the hubbed network office, a separate network element is required for each ring. Each of these network elements takes up expensive rack space and power within the hubbed network office. In addition, connecting two rings requires the installation of cross-connects in each of the network elements, as well as one or more linear connections between the two network elements. The establishment of these network connections requires expensive network operator time and is subject to human error. Furthermore, the service provider most predict how much bandwidth must be exchanged by each pair of rings, and hardware linear tributaries accordingly. Changes in requirements require re-wiring the interconnects between the network elements, possibly: 1) disturbing traffic being carried on the existing interconnects; and 2) requiring the addition of more network elements or rings in order to provide the additional interconnects. On a network-wide basis, these complications lead to circuit provisioning delays of many months.

Additional limitations with respect to the hubbed network office can be understood with respect to FIGS. 9A–B. In particular, FIGS. 9A–B illustrate two different techniques for interconnecting more than two rings in a hubbed network office. Both of FIGS. 9A and 9B illustrate a network element 905, a network element 910, a network element 915, and a network element 920. A different ring is connected to each of these network elements. For purposes of illustration, one of these rings (ring 900) is shown to include four fibers, whereas the remainder of the rings are shown to include two fibers. It should be noted that this is done merely for exemplary purposes, and thus, any one of the rings may be a two or four fiber ring.

FIG. 9A illustrates a hubbed network office in which the network elements are interconnected by linear interfaces according to the prior art. In particular, FIG. 9A shows that each of the network elements is connected to the other network elements via one or more linear interfaces. In both of FIGS. 9A and 9B, a hash through a line indicates that that line represents one or more connections. The hashes on the lines interconnecting network element 905 to the network elements 910, 920, and 915 are respectively labeled R, S and T. This is done for the network element 905 for purposes of the following illustration. Since the aggregate bandwidth of the linear interfaces of any one of the network element 905, 910, 915, and 920 is no greater than the aggregate bandwidth of the ring interfaces, a limited amount of bandwidth can traverse between any given set of two rings. For example, where the network element 905 has X linear interfaces, T+S+R must be less than or equal to X. In addition, the bandwidth of the X linear interfaces is no greater than the bandwidth of the ring 900. Thus, if it was desired to move the traffic from ring 900 to the ring connected to network element 915, all of the linear interfaces of the network element 905 would be required for that purpose.

It is also relevant to note that the connections between each of the network elements are hardwired, and thus, incorrect estimates in the amount of bandwidth that must be provisioned between these network elements requires rewiring the interconnects.

FIG. 9A also illustrates that a digital cross-connect 930 may optionally be included. This digital cross-connect 930 could be connected to each of the network elements to allow for greater flexibility in switching and/or the adding/dropping of other traffic. It should be noted that the number of ports required on the digital cross-connect 930 is driven by the amount of bandwidth with which that digital cross-connect is going to be connected to each of the network elements in FIG. 9A.

FIG. 9B illustrates a hubbed network office in which the network elements are interconnected via a digital cross-connect according to the prior art. In particular, FIG. 9B illustrates that each of the network elements is connected to a digital cross-connect 935 by their linear interfaces. While the digital cross-connect 935 allows for a greater flexibility in switching between the rings, it should be understood that the digital cross-connect 935 requires a significantly larger number of ports for all of the connections to the linear interfaces of each of the network elements. Due to the cost of a digital cross-connect with this many ports, the scheme illustrated in FIG. 9B is rarely used.

BRIEF SUMMARY OF THE INVENTION

A ring network element and the ring network architectures it enables is described. According to one embodiment of the invention, a single network element includes a full TDM cross-connect and a multiple ring unit. The full TDM cross-connect is coupled to every line card slot in the single network element with the same amount of bandwidth connection. In addition, the full TDM cross-connect is programmable on an STS-1 basis. The multiple ring unit allows for the simultaneous support of multiple TDM rings.

BRIEF DESCRIPTION OF THE DRAWINGS

The invention may best be understood by referring to the following description and accompanying drawings that are used to illustrate embodiments of the invention. In the drawings:

FIG. 4 is a flow diagram illustrating the manner in which the planning and deployment of access connections to customer premise equipment can be performed according to one embodiment of the invention.

DETAILED DESCRIPTION OF THE INVENTION

A multiplexing ring network element and the network architectures that it enables are described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The techniques shown in the figures can be implemented using code and data stored and executed on the network elements. Such network elements store and/or communicate (internally and with other network elements over the network) code and/or data using machine-readable media, such as magnetic disks; optical disks; random access memory; read only memory; flash memory devices; electrical, optical, acoustical or other form of propagated signals (e.g., carrier waves, infrared signals, lasers, digital signals, etc.); etc. Of course, one or more parts of the invention may be implemented using any combination of software, firmware, and/or hardware.

Figure 2:
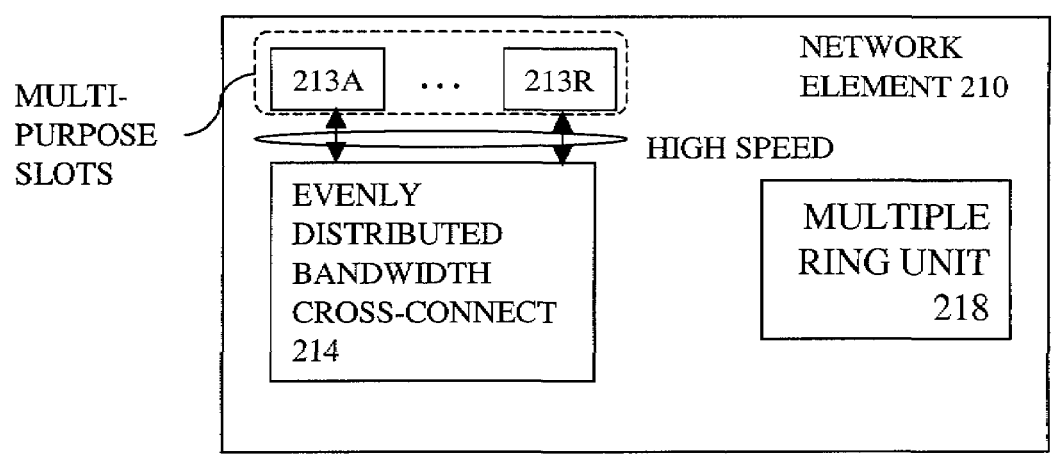
FIG. 2 illustrates a multiplexing ring network element according to one embodiment of the invention.

Implementations of a Multiplexing Ring Network Element According to Embodiments of the Invention FIG. 2 illustrates a multiplexing ring network element according to one embodiment of the invention. While FIG. 2 illustrates a fully featured network element according to one embodiment of the invention, alternative embodiments may require less of these features depending upon the network architecture within which it is used. With respect to the different exemplary network architectures described herein, the features which are optional will be identified.

In FIG. 2, a multiplexing ring network element 210 is shown to include a number of multipurpose slots 213A–213R, an evenly distributed bandwidth cross-connect 214, and a multiple ring unit 218. In the embodiment illustrated, each of the multipurpose slots 213A–213R is connected to the cross-connect 214 with the same amount of high-speed bandwidth. Thus, there is no differentiation between high speed and low speed slots for rings and linear connections, respectively. The cross-connect 214 is a full cross-connect that operates in a non-blocking fashion. While the embodiment of FIG. 2 has the same high-speed bandwidth to every slot, an alternative embodiment could have different speed bandwidth connections to different ones of the slots.

The multiple ring unit 218 represents hardware, firmware and/or software that allows for multiple rings (e.g., SONET/SDH TDM BLSR, SONET/SDH TDM UPSR, etc.) to be connected to the network element 210 via interfaces provided by the multipurpose slots. Since each of the multipurpose slots is connected to the cross-connect with the same amount of high-speed bandwidth, the network element 210 can be connected to one or more and a combination of high speed and low speed rings. An exemplary software implementation of the multiple ring unit 218 will be described later herein with respect to FIG. 6.

Each of the multipurpose slots can receive a line card. Thus, the cross-connect 214 has the same high-speed bandwidth connection to each interface within the chassis of the network element 210. The line cards that can be inserted into the slots of the network element 210 can have one or more ports. If a line card that has multiple ports is used, multiple low speed rings can be connected to different ports of that line card.

By way of example, one exemplary embodiment has: 1) 12 multipurpose slots for line cards, 2) each of these multipurpose slots is connected to the cross-connect 214 with OC-48 worth of bandwidth; and 3) the cross-connect 214 can handle 576×576 STS-1s in a completely nonblocking fashion. While various techniques can be used to implement the cross-connect 214, one exemplary implementation is described in the U.S. Nonprovisional patent application entitled "A Cross-Connect with Shared Storage", Ser. No. 09/752,649, filed Dec. 29, 2000. While this exemplary embodiment is described with respect to OC-48, alternative embodiments could support a different amount of bandwidth connection between the cross-connect and each of the multipurpose slots, a different number of slots, and/or a less powerful cross-connect.

In addition, the network element can provide the following full complement of functionality:

Time Slot Assignment (TSA)
    Any incoming ring timeslot (a) to any outgoing tributary timeslot (b)
    Any incoming tributary timeslot (c) to any outgoing ring timeslot (d)
Time Slot Interchange (TSI)
    Any incoming ring timeslot (a) to any outgoing ring timeslot (b)
    Ring to Ring Additionally, the network element can optionally provide the following:

Hairpinning
    Any incoming tributary timeslot (a) to any outgoing tributary timeslot (b)
Drop & Continue (Broadcast)

Combination dropping traffic via (TSA) and continuing traffic on the same or different (using TSI) high-speed timeslot. Broadcast allows any timeslot to be duplicated to any other timeslot, or multiple timeslots, in a unidirectional fashion.

Furthermore, an optional extension of the bandwidth management capabilities includes a non-intrusive bridge and monitor capability to any STS-1 going through the cross connect, including concatenated payloads. This allows either direction of a circuit to be bridged and routed to any vacant port. This vacant port can be designated the test port and typically would have an optical test set or test head connected to it. The user can then evaluate the condition of the incoming STS-1 without affecting the condition of the working path. Multiple bridges can exist simultaneously, allowing monitoring of more than a single circuit and/or monitoring of both directions of a circuit (or circuits) at the same time. This feature can be used to do pro-active network maintenance. It can also be used to determine the condition of signals coming from customers or other service providers to evaluate Service Level Agreement (SLA) issues.

Figure 1:
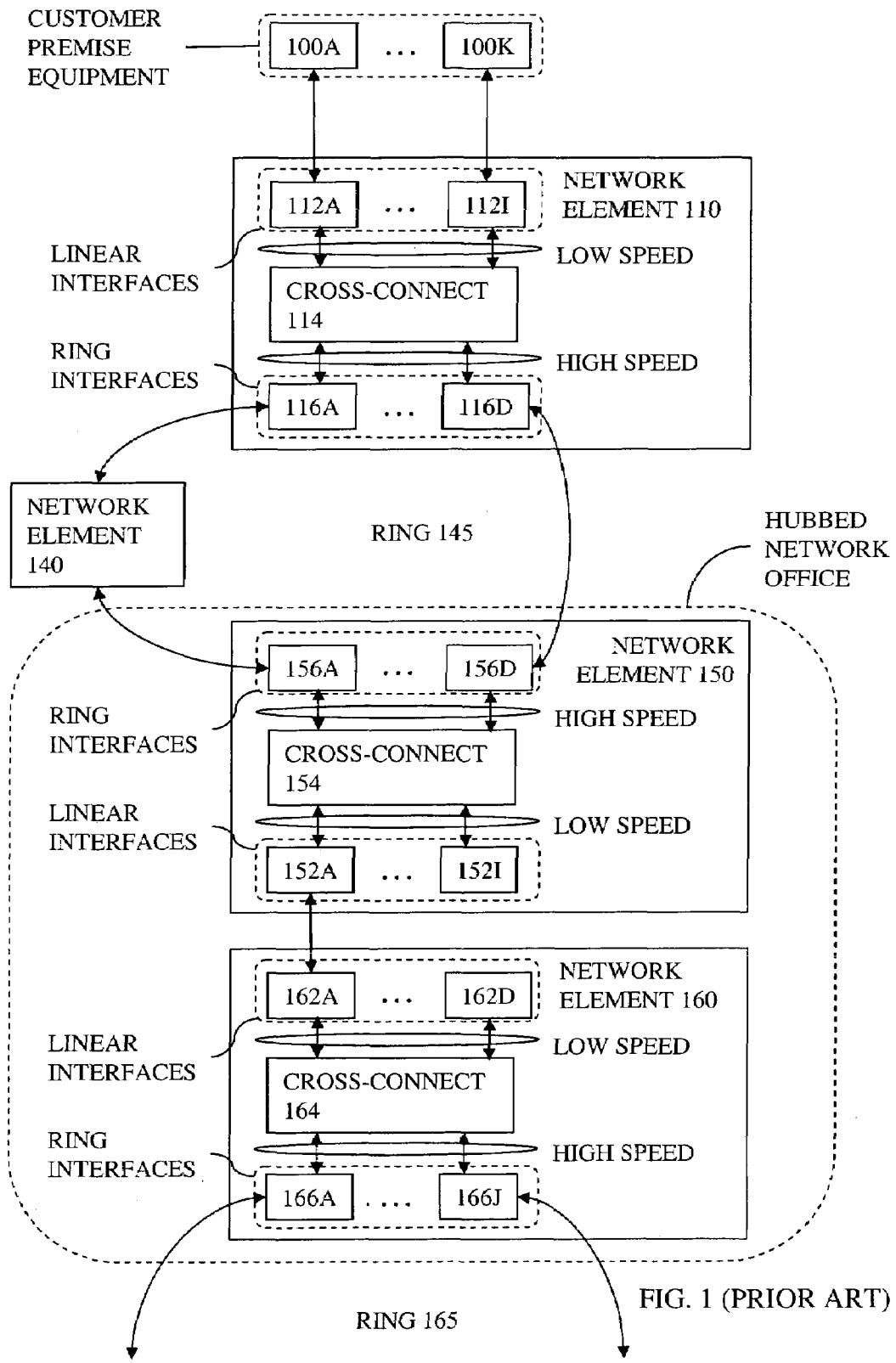
FIG. 1 illustrates a type of multiplexing ring network element and the typical network architectures within which it is used according to the prior art.

In comparison to the network element architecture described in FIG. 1, the network element architecture described in FIG. 2 can be more expensive to construct. However, the network element in FIG. 2 changes the way network owners will build out their networks, and thus the architecture of those networks. These new network architectures increase the rate with which network owners can meet increasing bandwidth needs of customers. Thus, as described in more detail later herein, the amortization of this cost over time results in a reduction in the total operational cost by minimizing the total number of chassises, optimizing space and power, avoiding the redeployment of higher bandwidth lines as often, etc.

Network Architectures

Figure 3:
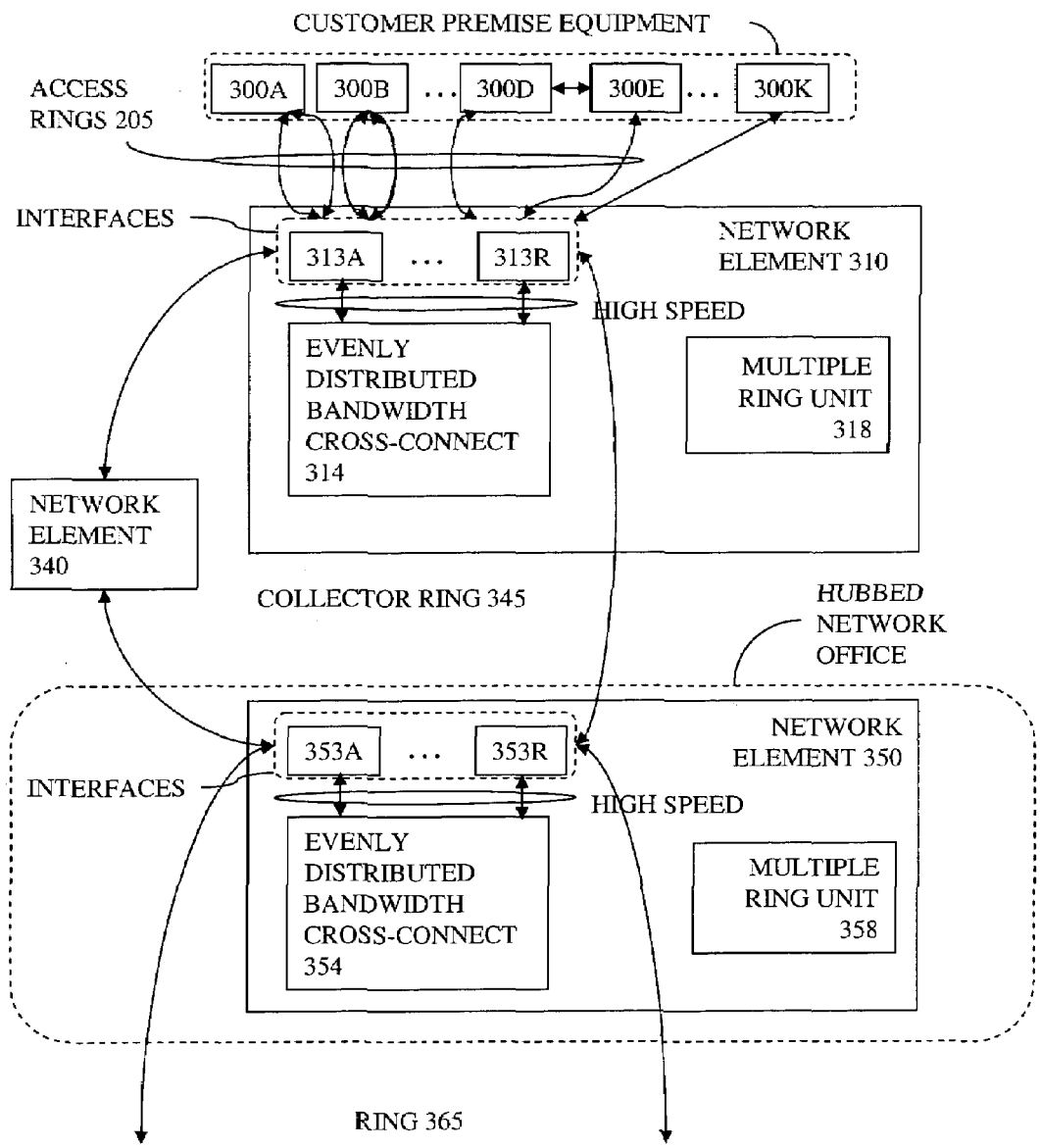
FIG. 3 is a diagram illustrating the use of network elements of the architecture in FIG. 2 at different points in the network to enable different network architectures according to one embodiment of the invention.

FIG. 3 is a diagram illustrating the use of network elements of the architecture in FIG. 2 at different points in the network to enable different network architectures according to one embodiment of the invention. In particular, FIG. 3 illustrates multiplexing ring network elements 310 and 350, respectively having: multipurpose slots 313A–313R and 353A–353R; evenly distributed bandwidth cross-connects 314 and 354; and multiple ring units 318 and 358.

A collector ring connects the network elements 310 and 350 with a network element 340. The network element 310 provides connectivity between customer premise equipment 300A–300K and the collector ring 345. The network element 350 resides in a hubbed network office to which a ring 365 is also connected.

In a metro environment, the network element 310 is a member of a metro collector ring (the collector ring 345) and provides metro access to the customer premise equipment 300A–300K. The network element 350 is used to connect the metro collector ring 345 to the ring 365. The ring 365 may be a similar metro collector, a higher bandwidth ring onto which multiple metro collector rings are aggregated (referred to herein as a metro core and at times implemented using wave division multiplexing (WDM), dense wave division multiplexing (DWDM), or some other higher bandwidth connectivity), or some form of long haul transport.

Of course, the network element 350 may also be connected to: 1) any number of pieces of customer premise equipment; and 2) one or more other collector rings. This flexibility is omitted from FIG. 3 for clarity.

Access Network Architecture

In an access network architecture, the architecture of the network element of FIG. 2 allows for: 1) the connection of customer premises equipment using access rings; and 2) the changing of the method by which connections to the pieces of customer premises equipment are selected and managed.

In particular, the multiple ring unit 318 allows the network element 310 to be connected to the customer premise equipment 300A–300E using access rings 205 (e.g., SONET/SDH TDM BLSR, SONET/SDH TDM UPSR, etc.). These access rings 205 are also referred to as subtending rings, while the network element 310 is referred to as a backbone subtender. By way of particular example, assume that the collector ring 345 is a SONET TDM two fiber BLSR OC-48 ring. In addition, assume that the cross-connect 314 is connected to each of the multipurpose slots 313A–313R with STS-48 worth of bandwidth. In this example, two of the multipurpose slots would be used to connect the network element 310 to the different directions of the collector ring 345 (causing two of the multipurpose slots to act as aggregation interfaces). Where the network element 310 includes 12 multipurpose slots, that leaves 10 multipurpose slots, each with STS-48 worth of bandwidth, that can be used for connecting customer premise equipment (where each of the multipurpose slots that has installed therein a line card coupled to customer premise equipment forms an access interface). Thus, each of the access rings 205 could support a variety of connections; including OC-3, OC-12, and OC-48. With respect to this example, if additional bandwidth was required on the collector ring 345, the bandwidth of collector ring 345 can be upgraded. For example, the bandwidth of the collector ring 345 can be upgraded by: 1) converting to a 4-fiber BLSR OC-48 ring with double the bandwidth (requiring 4 of the multipurpose slots of the network element 310); 2) installing one or more additional rings (e.g., OC-48) with new optical fiber in parallel with the original collector ring 345; 3) installing with WDM one or more additional rings in parallel with the original ring (each ring having its own color); 4) having the network element architecture be upgradeable to have certain slots be connected with more bandwidth than other slots (e.g., OC-192) and using those higher bandwidth slots to connect to a higher bandwidth ring; etc.

Each customer premise equipment may be connected via a dedicated access ring 205 as shown in FIG. 3 for customer premise equipment 300A and 300B, or multiple customer premises may be aggregated onto a single access ring 205 as shown for customer premise equipment 300D and 300E.

While access rings 205 are illustrated in FIG. 3, a linear connection is also illustrated in FIG. 3 (see connection to customer premise equipment 300K) to indicate that either or both of access rings and linear connections could be used. However, an alternative embodiment of the network element 310 supports only a single collector ring and uses linear connections to the customer premise equipment.

Whether or not access rings and/or linear connections are supported or used, the amount of bandwidth available for connecting customer premise equipment is substantially greater than the total bandwidth of the collector ring 145. This is a result of the architecture of network element 310 having the same high-speed bandwidth connection to every slot in the chassis. As described below with respect to FIG. 4, this allows a network operator to deploy significantly greater bandwidth to each customer premise and decide later how much actual bandwidth to provision to them.

FIG. 4 is a flow diagram illustrating the manner in which the planning and deployment of access connections to customer premise equipment can be performed according to one embodiment of the invention. In block 400, multiple access connections (whether they be ring or linear) are connected to a multiplexing ring network element such that the sum of the bandwidth of the access connections is substantially greater than the collector ring bandwidth, but that the sum of the current bandwidth usage requirements of the customers on the access connections is less than the available bandwidth on the collector ring(s). From Block 400, control passes to Block 410.

In Block 410, the traffic from the access connections to the collector ring is groomed by provisioning add/drops between the collector rings and the access connections to meet the current usage requirements of the customers on the access connections. For example, an OC-12 access ring may initially be allocated only one STS-1 of collector ring bandwidth; leaving the remaining eleven STS-1s of access ring bandwidth available for future bandwidth growth. From block 410, control passes to block 420.

As shown in block 420, over time the add/drop bandwidth is increased between the collector ring and different ones of the access connections on an as-needed basis, and/or additional access connections are installed. Control passes from block 420 to block 430.

In block 430, if the sum of the bandwidth requirements of the access connections increases beyond the available bandwidth on the collector ring, the bandwidth of the collector ring is upgraded. The upgrading of the bandwidth of the collector ring is far easier than upgrading the connections to the various customer premise equipment.

Thus, the access network architecture of FIGS. 3 and 4 rely on the assumption that not every one of the access connections (whether they be access rings or linear connections) will be fully utilized (i.e., not every piece of customer premise equipment will require the use of the actual bandwidth deployed to them). The network architecture in FIG. 3 anticipates that some customers will grow to be large customers, whereas other customers will not. Those that grow to be bigger customers will be provisioned more bandwidth on the collector ring 345. The cross-connect 314 is used to provision to the collector ring the amount of bandwidth actually needed for each of the access connections.

Because of multiplexing multiple partially used high-speed connections to customer premise equipment, there is far more room for error with regard to the predictions as to future needs of a customer or area. Specifically, the access network architecture and the architecture of the network element described in FIG. 1 subscribe to the belief that every linear connection run to customer premise equipment will eventually require near if not all of the maximum bandwidth allowed by that connection. Thus, FIG. 1 suggests predicting the future bandwidth needs of a customer and attempting to match it closely as possible by deploying the correct amount of bandwidth. In contrast, in FIG. 4 a substantially greater amount of bandwidth than predicted to be needed is deployed to the different pieces of customer premises equipment. Thus, whereas the prior art runs a T1 line to a given piece of customer premise equipment, and then later redoes that line when upgrading to a T3 (requiring the tearing up of the road again); the access network architecture described in FIGS. 3 and 4 suggests making may of the access connections OC-N connections and simply provisioning bandwidth through the cross-connect to the different access connections as it is needed. Although in FIG. 4 an excessive amount of bandwidth is deployed, the optical fibers need only be deployed once (e.g., the roads are only torn up once). In addition, when a customer requests a higher bandwidth connection, that connection can be provisioned almost immediately by changing the configuration of the cross-connect (typically done remotely using software); thereby allowing the income from that higher bandwidth connection to be charged immediately.

This results in a lower overall operational cost for the network owner. In particular, the network owners which do not have time to put new equipment and new fiber in place, will no longer need to install new connections to customer premise equipment as often. Rather, excessively over provisioning the bandwidth to the customer premise equipment and using the cross-connect to groom the traffic onto the collector ring 345 on an as-needed basis means that a longer period of time will pass before the installation of new equipment and fibers is required. Thus, the network element was designed to make it cost effective to install a large number of high bandwidth interfaces to customers and decide later how much actual bandwidth to give them. This allows for less accurate predictions regarding future customer needs, and therefore the errors associated with such predictions.

Furthermore, since there is a high-speed connection to every slot, line cards to be installed in these slots can support a high port density (e.g., one exemplary line card has four OC-12 ports).

As stated earlier, when the requirements for bandwidth of the different customer premise equipment totals a greater amount than is available on the collector ring 345, the collector ring 345 will need to be upgraded to meet the demand. It should be noted that updating the collector ring 345 is easier to do than to upgrade the bandwidth to the multiple customer premise equipment locations.

It should be noted that the above-described manner of planning and deploying access connections to customer premise equipment is not limited to the network element architecture in which every slot is connected to the cross-connect with the same amount of bandwidth. Rather, alternative embodiments in which different slots are connected to the cross-connect at different speeds can be implemented such that the amount of bandwidth available for connecting customer premise equipment is substantially greater than the total bandwidth for the collector ring.

Hubbed Network Office Architecture

Returning to FIG. 3, the network element 350 in the hubbed network office is connected to both the collector ring 345 and the ring 365. Both of these rings may be high-speed rings because the network element 350 has the same high-speed bandwidth connection to every one of the multipurpose slots 353A–353R. In addition, the cross-connect 354 allows traffic to be passed between the two rings at the same speed as the rings themselves. Thus, the hubbed network office of FIG. 3 requires a single network element 350 to connect the two rings, whereas the hubbed network office in FIG. 1 required two separate network elements. In addition, the two rings are connected in the hubbed network office of FIG. 3 using the cross-connect 354, whereas the two rings in FIG. 1 are connected through low speed linear interfaces, cross-connects installed in the cross-connect 154, and cross-connects installed in the cross-connect 164. Furthermore, wherein SONET is used and the cross-connect 354 allows for the cross-connecting any STS-1 to any STS-1, any amount of bandwidth from one ring can be passed to the other.

Figure 9A:
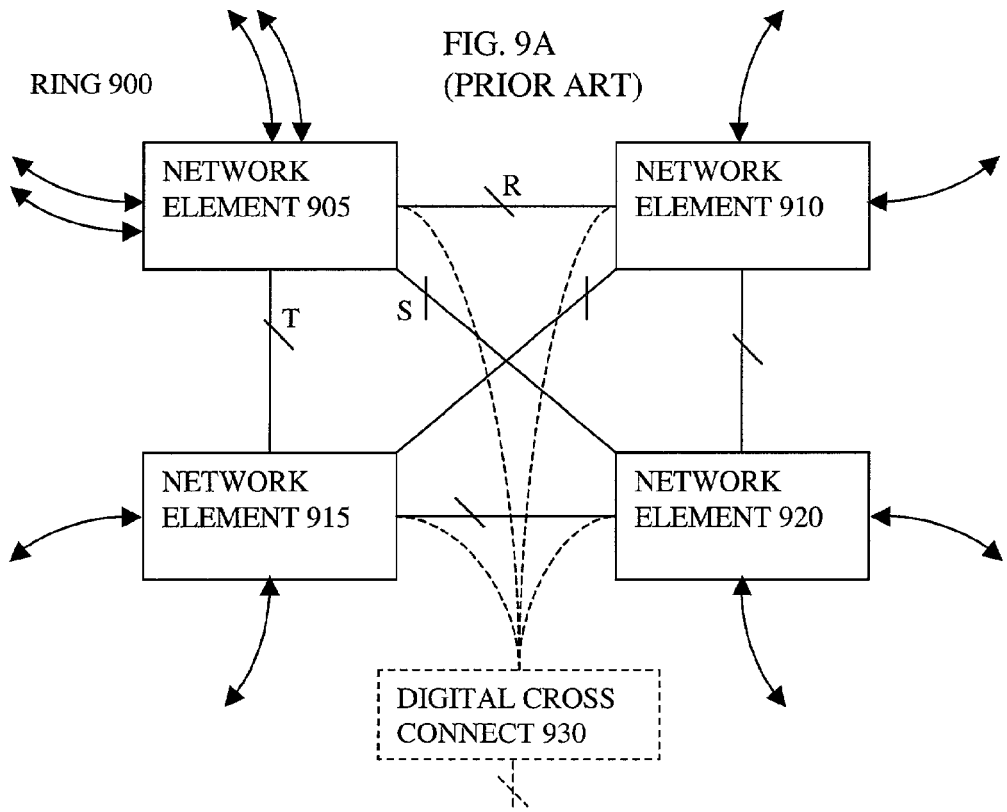
FIG. 9A illustrates a hubbed network office in which the network elements are interconnected by linear interfaces according to the prior art.
Figure 9B:
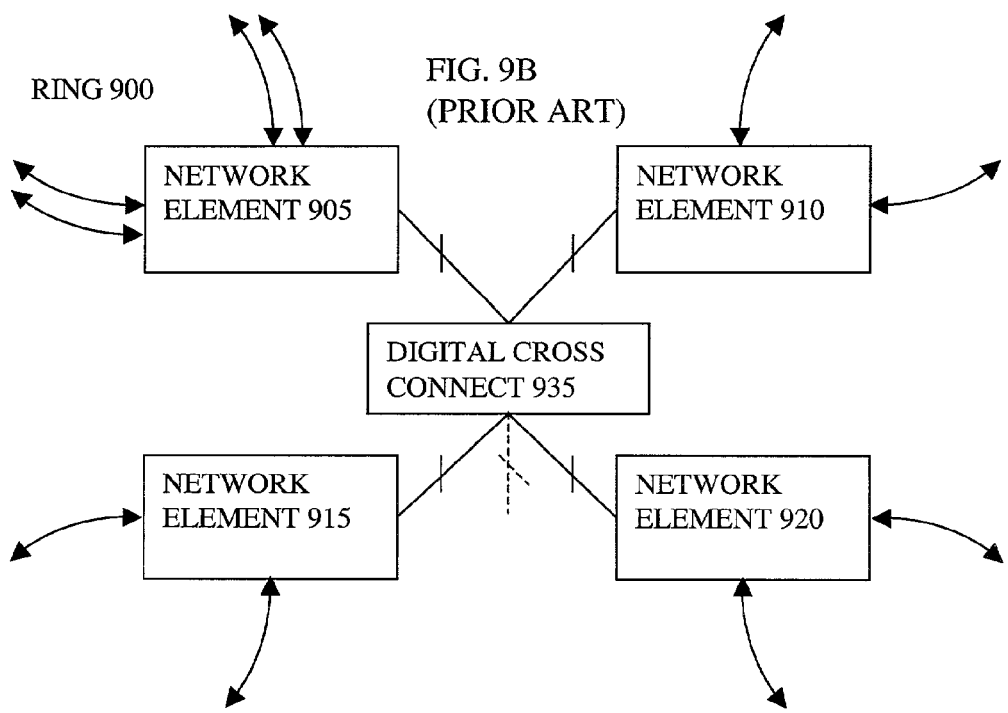
FIG. 9B illustrates a hubbed network office in which the network elements are interconnected via a digital cross-connect according to the prior art.

Thus, the hubbed network office of FIG. 3 requires less interoffice connectivity and less connections to be installed in order to connect the two rings. This allows for an easier connection of rings, requires less rack space and power, and is less error prone. It should also be noted that in FIG. 3 additional rings (e.g., collector rings) might be connected to the same network element 350. Furthermore, a digital cross-connect could be connected to the network element 350 for the purposes of adding and/or dropping traffic. This cross-connect would require less ports than those found in FIGS. 9A and B. In addition, customer premise equipment could also be connected to the same network element 350 (using linear connection(s) and/or access ring(s)).

Front-End to a WDM or DWDM System

Another use of the architecture of the network element described in FIG. 2 is to front-end a WDM or a DWDM system. For example, if each slot in the network element supports STS-48 and a multi-port line card is inserted into one of the slots, that interface can support any combination of bandwidth to each of these ports as long as the sum is not beyond STS-48. By way of particular example, assume there are 4 ports on the line card each supporting OC-12 worth of bandwidth. Since these four OC-12 ports are aggregated on the single line card and passed to the cross-connect through a single bandwidth connection, the WDM or DWDM can assign a single color to the aggregation of those four OC-12s. Each pair of slots can thus aggregate traffic for one wavelength on a WDM system. In contrast, since the architecture of the network element described in FIG. 1 has lower speed linear interfaces, traffic for only a few wavelengths can be aggregated.

Metro Access Deployment

Figure 5A:
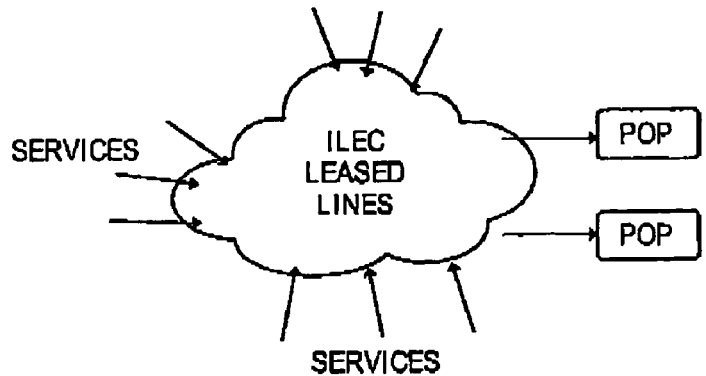
FIG. 5A illustrates a first phase of a metro buildout according to one embodiment of the invention.
Figure 5B:
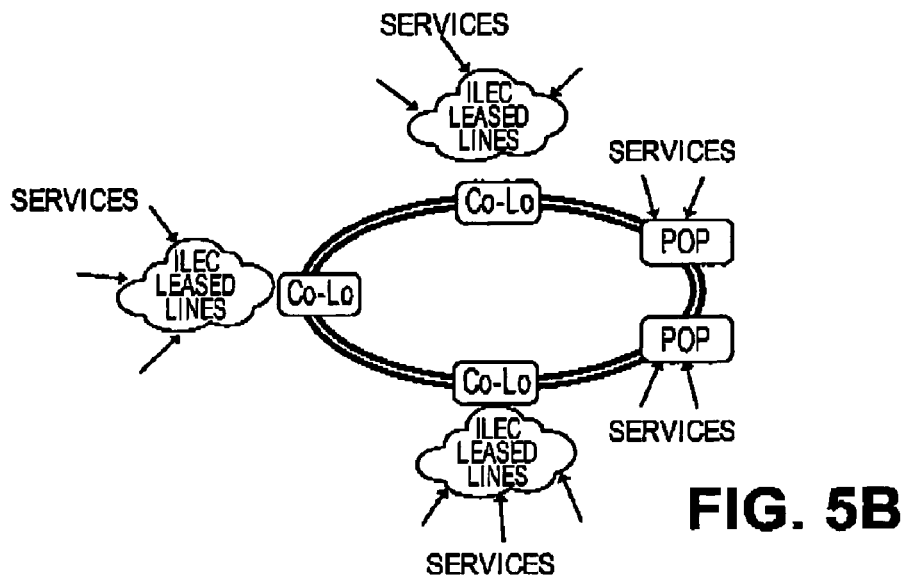
FIG. 5B illustrates a second phase of a metro buildout according to one embodiment of the invention.
Figure 5C:
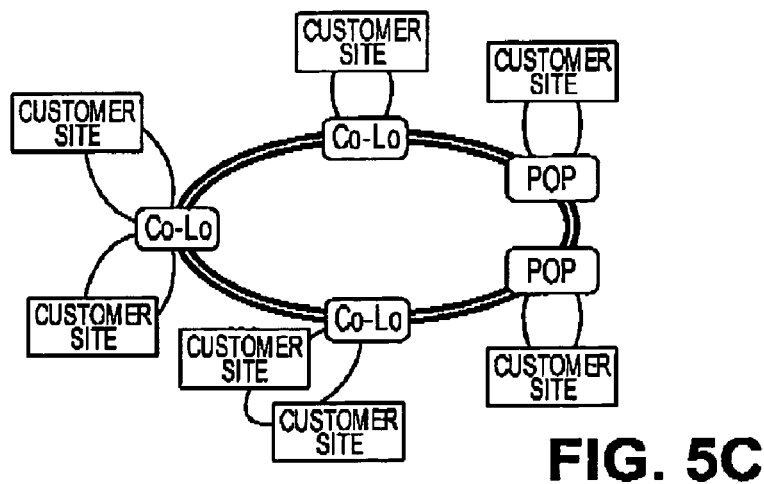
FIG. 5C illustrates a third phase of a metro buildout according to one embodiment of the invention.

A more particular example of the building of a metro ring using the network element of FIG. 2 will now be described. Specifically, FIGS. 5A–C illustrate a multi-phase access deployment strategy according to one embodiment of the invention. The strategy basically includes:
1) Deploying the network element as an OC-N (where N is 48 for example) subtender at key locations;
2) Deploying an initial core infrastructure to strategic Co-Locations;
3) Building dedicated access rings as needed based on the business case and the business opportunity; and
4) Adding bandwidth to the collector ring as needed, driven by the demand requirements of the end customers.

Phase 1—Network Element Deployment in POP

FIG. 5A illustrates a first phase of a metro buildout according to one embodiment of the invention. In the first phase, the network element of FIG. 2 is deployed for local aggregation in the Backbone POP (BPOP). Depending on the location in question, there will typically be one or two BPOPs present in the initial stages of a metro build. For this example, we will assume that there are two BPOPs. During this initial phase, connectivity to the end customers can be achieved by using leased lines. These leased lines will enter the BPOP and can be connected to the network element via a multitude of interconnect options (e.g., DS3 to OC-48). At this stage, a relatively large amount of money is likely being spent on leased lines.

Phase 2—Collector Ring Buildout

FIG. 5B illustrates a second phase of a metro buildout according to one embodiment of the invention. In phase 2, a number of co-locations (Co-Lo) are established further into the metro network. The network element chassis of FIG. 2 would be placed in these Co-Los. These Co-Lo sites would be connected back to the BPOP using a ring configuration. This metro collector ring can be established without placing any additional equipment in the BPOP.

Establishing these Co-Lo sites can significantly reduce the need for, and therefore the cost associated with, the leased circuits. While the leased circuits may still be required, the Co-Los can be established at locations that minimize the need for leased lines.

Phase 3—Access Rings

FIG. 5C illustrates a third phase of a metro buildout according to one embodiment of the invention. During phase 3, access (subtending) rings are established further out into the network—right into the customer premise's. These can be established by building access rings directly from the network element chassis in the Co-Lo, as well as from the network element in the BPOP. The result is a further reduction of leased facilities with a fully integrated network topology. This topology has:
- no intra-office connections
- fully scalable integrated subtending rings
- high flexibility
- very high service velocity (ability to provision new services or upgrade existing ones with very short latency)

Exemplary Implementation of the Multiple Ring Unit

Figure 6A:
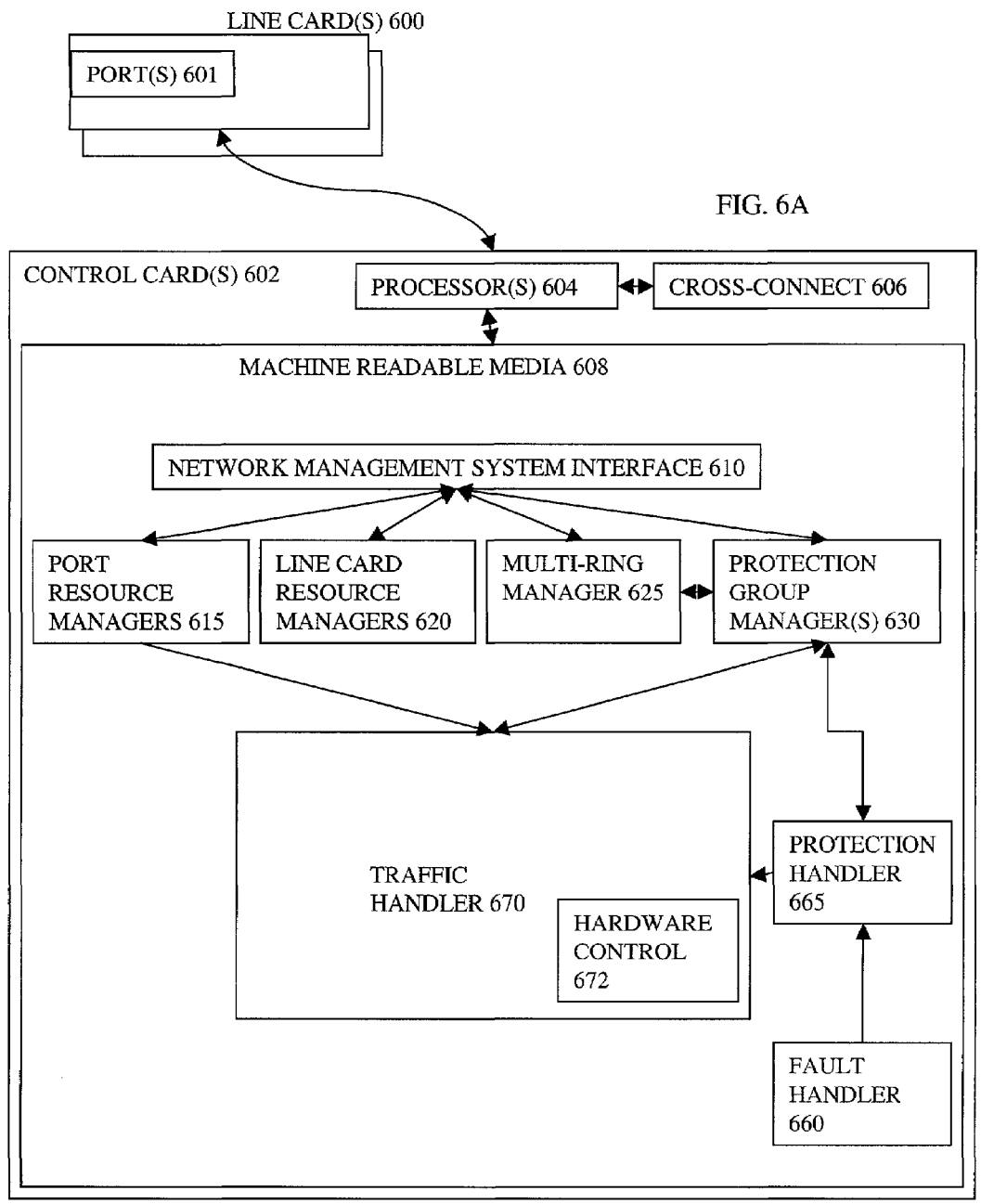
FIG. 6A is a block diagram illustrating an exemplary implementation of the multiple ring unit from FIG. 2 according to one embodiment of the invention.

FIG. 6A is a block diagram illustrating an exemplary implementation of the multiple ring unit from FIG. 2 according to one embodiment of the invention. While FIG. 6A illustrates hardware and firmware/software, it should be understood that the inventions described herein can be implemented with a variety of different distributions of workload between hardware, software, and/or firmware.

The network element illustrated in FIG. 6A includes a set of one or more redundant control card(s) 602. Each of these control card(s) 602 includes a cross-connect 606 and a set of one or more processors 604. While FIG. 6A illustrates a network element that supports a centralized cross-connect on the control cards, it should be understood that other architectures are within the scope of the invention (e.g., a network element in which the cross-connect is placed on a separate set of redundant "cross-connect" cards; a distributed cross-connect; etc.).

The processors execute software and utilize data structures stored within one or more machine-readable media 608. In FIG. 6A, it is illustrated that the machine-readable media 608 is on each control card 602. However, it should be understood that this machine-readable media 608 may be distributed in a different fashion (located off the control cards and shared by all the control card(s) 602, etc.). Each of the control card(s) is connected to each of the line card(s) 600 installed in the slots of the network element. Each of the line card(s) 600 includes one or more ports 601.

The machine-readable media 608 includes data and code for operating one or more rings. Specifically, the machine-readable media 608 includes a network management system interface 610. The interface 610 allows commands to be received from and data to be transmitted to a location external to the network element (e.g., a terminal connected to the network element, a remote server, etc.). The interface 610 may support one or more protocols, such a CLI, TL1, a propriety protocol, etc.

The machine-readable media 608 also includes structures (e.g., "classes" in object oriented programming) of which instances (e.g., "objects" in object oriented programming) are created and maintained while operating the network element depending on what hardware and/or connections are installed. Specifically, the machine-readable media 608 includes port resource managers 615, line card resource managers 620, a multi-ring manager 625, and protection group managers 630.

The port and line card resource managers store the basic configuration information for the different line cards and ports installed in the network element. Of course, additional resource managers could exist for other physical items in the network element.

The multi-ring manager 625 stores a network element ID, as well as a ring ID/protection group ID pair for each ring provisioned in the network element. The network element ID is an ID assigned the network element to distinguish it from other network elements in the network. A ring ID is assigned to each ring provisioned in the network element. Thus, the ring ID is used to the differentiate rings running through the network element.

In addition, there is a protection group manager 630 created for each ring running through the network element. Each protection group manager is assigned a protection group ID to distinguish it from other protection group managers. The multi-ring manager 625 can therefore locate the corresponding protection group manager 630 for each ring, while the protection group managers 630 provide provisioning information to the multi-ring manager 625.

While various ID are described herein for differentiating, locating, and/or associating different structures, it should be understood that this is merely a design choice. Thus, alternative embodiments may use other techniques (e.g., pointers).

The network management system interface 610 allows for the configuring of the network element through the various managers described above. Additional code is included that interacts with these managers to operate the network connections related thereto. In one embodiment, an instance of this additional code is instantiated for each ring currently provisioned in the network element.

Figure 6B:
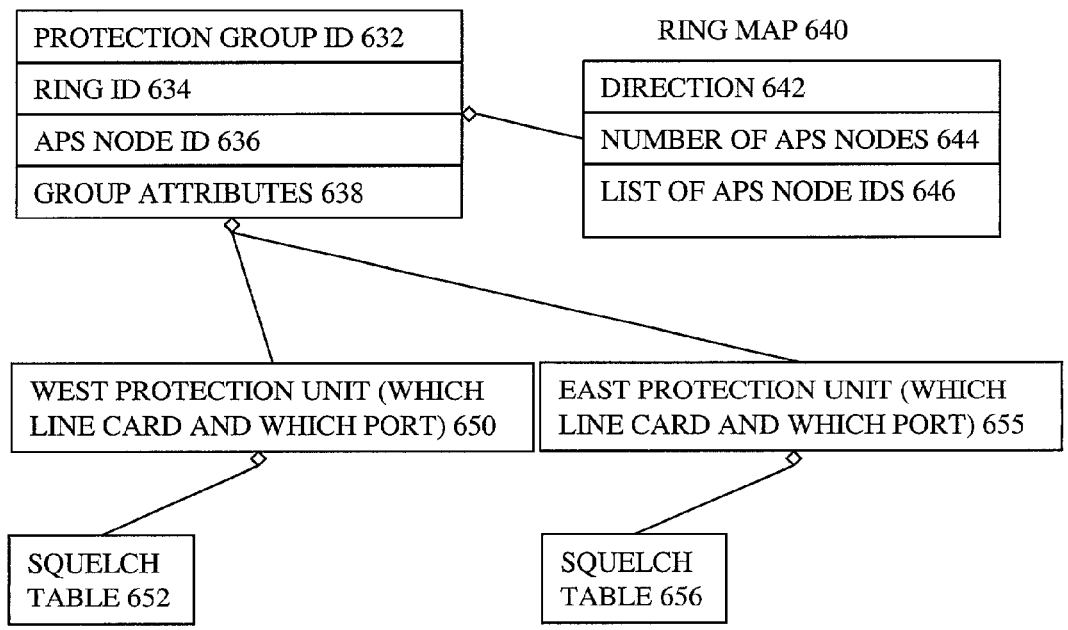
FIG. 6B illustrates an expanded view of an exemplary implementation of one of the protection group manager(s) 630 of FIG. 6A according to one embodiment of the invention.

FIG. 6B illustrates an expanded view of an exemplary implementation of one of the protection group manager(s) 630 of FIG. 6A according to one embodiment of the invention. The protection group manager 630A of FIG. 6B includes a protection group ID 632, a ring ID 634, an APS node ID 636, and group attributes 638. In BLSR, each node on the ring is assigned a different APS node ID. The APS node ID 636 identifies the APS node ID assigned to the network element for the ring identified by the ring ID 634. It should be noted that since multiple rings can pass through a network element architected according to the invention, a given network may have multiple APS node IDs. The group attributes 638 represent other attributes that would be stored in this structure.

The protection group manager 630A also owns a ring map 640. While various techniques could be used to encode the information required by a ring map (a map that identifies the order of the APS nodes in the ring relative to this network element), the ring map illustrated in FIG. 6B includes a direction 642, the number of APS nodes 644, and an ordered list of the APS node IDs 646.

The protection group manager 630A also owns a west protection unit 650 and an east protection unit 655. These protection units identify which line card and which ports has been allocated to support the ring. In addition, the protection units 650 and 655 respectively own squelch tables 652 and 656. Squelch tables are well known in the art.

Returning to FIG. 6A, there is also illustrated a fault handler 660 that reports faults (e.g., in the optical fiber, ports, line cards, etc.) to a protection handler 665. Based on the reports received from the fault handler 660 and the provisioning information in the protection group manager of the ring, the protection handler 665 would determine when protection switches and un-switches should be performed using well known techniques. The protection handler 665 communicates these protection events to a traffic handler 670. The traffic handler 670 includes hardware control 672 for controlling the hardware in the network element (including the cross-connect, various ports, etc.).

It should be understood that while certain data structures have been described with reference to FIGS. 6A and B, alternative embodiments of the invention could use different data structures storing more, less and/or different information that effectively associate certain physical resources and ring information with different rings passing through the network element.

Expansion of the Data Communication Channels

Under current SONET standards (see Bellcore GR-253), a fixed number of the Data Communication Channel (DCC) bytes within the transport overhead of a SONET signal are employed for the transmission of Operations, Administration, Maintenance and Provisioning (OAM&P) information among network elements using a SONET signal, irrespective of the number of STS frames being interleaved within the SONET signal. For each STS-1 frame within a SONET signal, the transport overhead includes a section overhead and a line overhead. Moreover, each section overhead for a given STS-1 frame includes three Data Communication Channel (DCC) bytes, while each line overhead includes nine DCC bytes. Therefore, an OC-48 SONET signal transmitting 48 interleaved STS-1 frames includes 144 (48×3) DCC bytes in the section overhead and 432 (9×48) DCC bytes in the line overhead. However, as set forth above under current SONET standards, a limited number of the possible 576 DCC bytes for a OC-48 SONET signal are employed for the transmission of OAM&P information between network elements.

Figure 7:
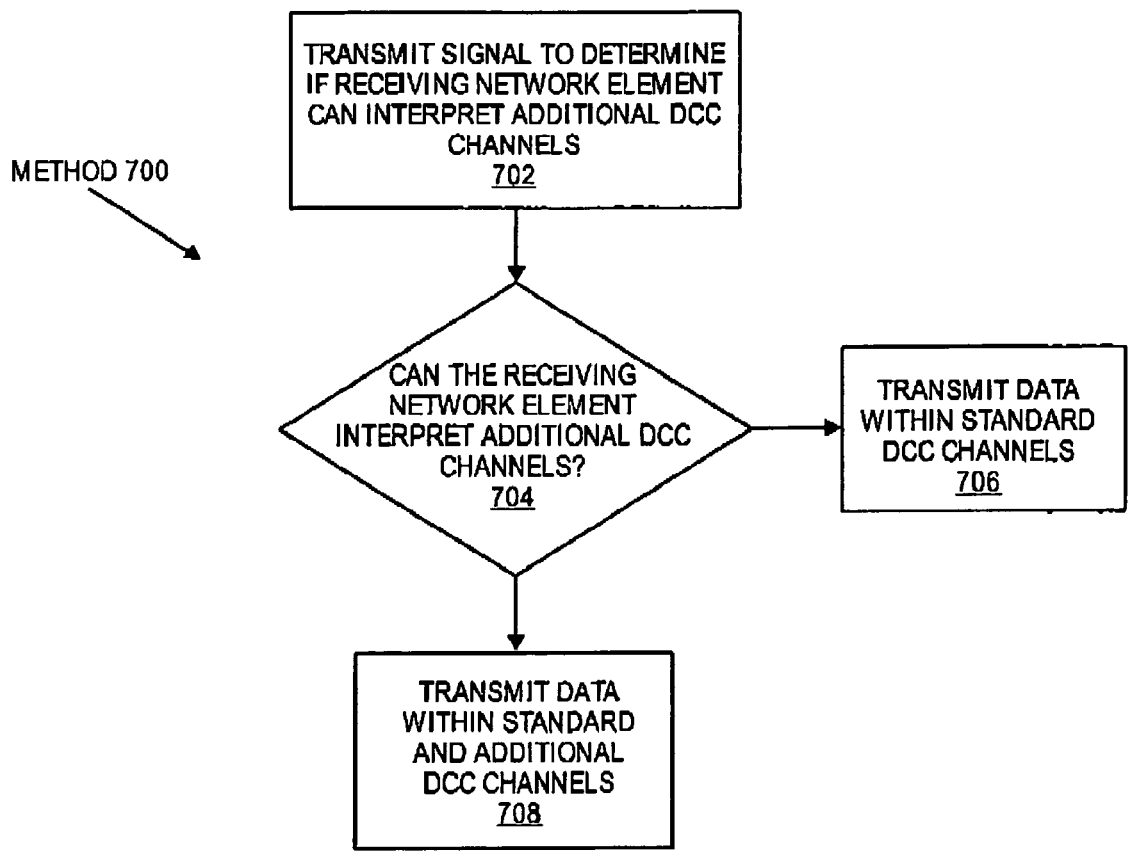
FIG. 7 is a flowing diagram illustrating selective incorporation of additional DCC bytes for management communication according to embodiments of the present invention.
Figure 8:
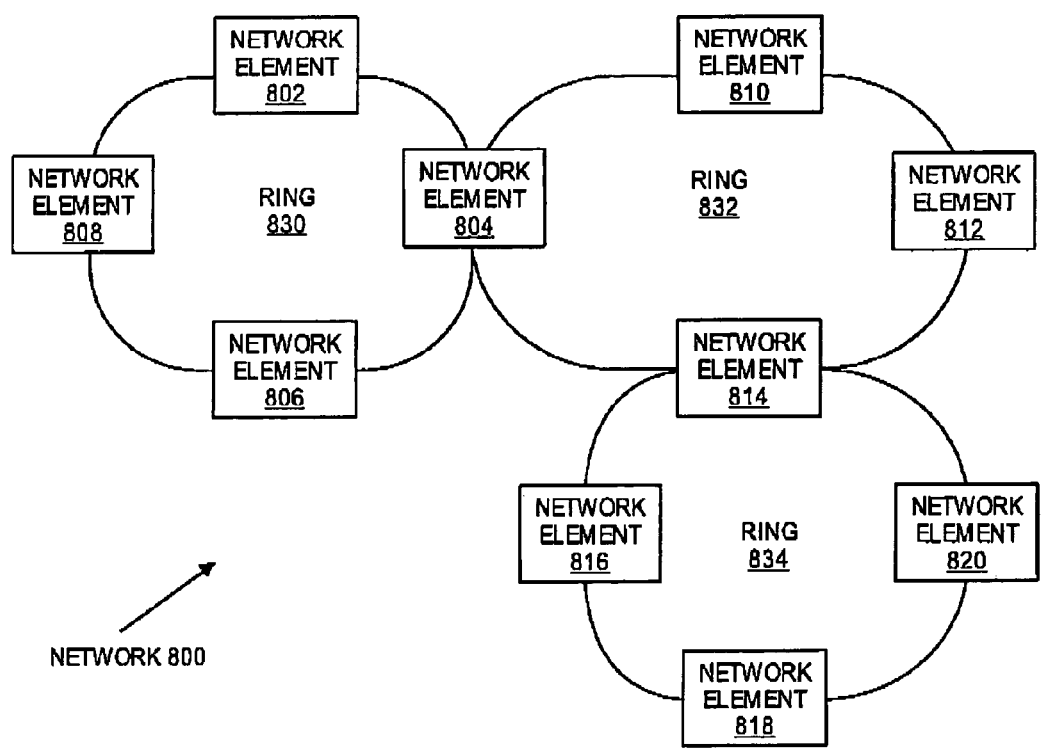
FIG. 8 illustrates a multi-ring network architecture that selectively incorporates additional DCC bytes for management communication, according to embodiments of the present invention.

Examples of OAM&P information include, but are not limited to, information related to the building of circuits across a number of network elements as well as cross connects within a network element for the building of such circuits. Ring maps, squelch tables and concatenation tables, as described above, can also be included in the OAM&P information being transmitted within the DCC bytes of a SONET signal. Moreover, other OAM&P information can include router tables and Open Shortest Path First (OSPF) data. However, embodiments of the present invention are not limited to such data within the DCC bytes, as any other type of communication between network elements and/or the network management system and network elements can be transmitted across the DCC bytes. FIGS. 7 and 8 illustrate embodiments of the present invention that selectively employ the additional DCC bytes for communication of OAM&P information (i.e., management information).

FIG. 7 is a flow diagram illustrating selective incorporation of additional DCC bytes for management communication, according to embodiments of the present invention. Method 700 of FIG. 7 commences with the transmission of a signal, from the transmitting network element to the receiving network element, to determine if the receiving network element can interpret additional Data Communication Channels (DCC) within a SONET/SDH signal communicated between the two network elements. In one embodiment, this signal includes a bit combination within the additional DCC bytes indicating to the receiving network element to transmit a bit combination within the additional DCC bytes indicating that the receiving network element can interpret data in the additional DCC bytes.

However, the transmission of this signal is not so limited, as other techniques can be employed to transmit the signal to the receiving network element. For example, in another embodiment, such a signal can be transmitted through the standard DCC bytes employed for communication between two network elements using a SONET/SDH-based signal. In another embodiment, this signal can be transmitted within other parts of the transport overhead and/or the payload of the SONET/SDH signal.

In one embodiment, this signal to determine if the receiving network element can interpret data in the additional DCC bytes is transmitted during initial connectivity between the two network elements. In an embodiment, this signal to determine if the receiving network element can interpret data in the additional DCC bytes is transmitted prior to each transmission of management communications within the additional DCC bytes.

The transmitting network element determines whether the receiving network element can interpret the additional DDC bytes, at process decision block 704. In one embodiment, the transmitting network element makes this determination using a timeout mechanism. In one such embodiment, the transmitting network element starts a timer upon transmission of the signal to the receiving network element. If the timer expires without receiving an acknowledgement, as described above, from the receiving network element, the transmitting network element determines that the receiving network element cannot interpret data within the additional DCC bytes. Accordingly, the transmitting network element transmits data within the standard DCC bytes, at process block 706. However, if an acknowledgement signal is received from the receiving network element, the transmitting network element determines that the receiving network element can interpret data in the additional DCC bytes. The transmitting network element, therefore, transmits data within the standard and additional DCC bytes of the SONET/SDH signal, at process block 708.

In one embodiment, the number of additional DCC bytes to transmit management communication includes the DCC bytes within the section overhead. Accordingly, for an OC-48 signal, 144 DCC bytes are available for management communication. In another embodiment, the number of additional DCC bytes to transmit management communication includes the DCC bytes within the line overhead. For an OC-48 signal, therefore, 432 DCC bytes are available for management communication. The above-described number of additional DCC bytes is by way of example and not by way of limitation as a greater or lesser number of DCC bytes may be employed in the management communication. Moreover, in an embodiment, the signals between the transmitting and receiving network elements indicate the number of additional DCC bytes to be incorporated into the management communication.

FIG. 8 illustrates a multi-ring network architecture that selectively incorporates additional DCC bytes for management communication, according to embodiments of the present invention. FIG. 8 illustrates network 800 that includes ring 830, ring 832 and ring 834. Ring 830 includes network element 802, which is coupled to network element 804, which is coupled to network element 806, which is coupled to network element 808, which is coupled to network element 802. Ring 832 includes network element 804, which is coupled to network element 810, which is coupled to network element 812, which is coupled to network element 814, which is coupled to network element 804.

Additionally, ring 834 includes network element 814, which is coupled to network element 820, which is coupled to network element 818, which is coupled to network element 816, which is coupled to network element 814. As illustrated, the network elements of ring 830 communicate with the network elements of ring 832 through network element 804, according to embodiments of the present invention. Similarly, the network elements or ring 832 communicate with the network elements of ring 834 through network element 814, according to embodiments of the present invention.

Additionally, network elements 802–808 can interpret the additional DCC bytes within a SONET signal. Network elements 810–814 cannot interpret the additional DCC bytes within a SONET signal, while network elements 816–820 can interpret the additional DCC bytes within a SONET signal. Accordingly, network elements within ring 830 and ring 834 can interpret the additional DCC bytes, while a number of network elements within ring 832 cannot. Therefore, a given network element can communicate with different network elements employing different number of DCC bytes for communication. For example, when network element 804 communicates with network elements 802 or 806, the additional DCC bytes can be employed for management communication. However, when network element 804 communicates OAM&P information to network elements 810 and 814 within ring 832, the standard DCC bytes are employed.

As illustrated, embodiments of the present invention can include a number of different network elements coupled together through a number of different rings. Accordingly, the quantity of OAM&P information being transmitted between network elements within a multi-ring architecture increases while the number of DCC bytes available remains constant. Moreover, multi-ring architectures can be established such that less than the total number of the network element can interpret OAM&P information in DCC bytes not set forth under current SONET standards.

Embodiments of the present invention are described such that OAM&P information from a number of different network elements across a number of network rings can be communicated through additional DCC bytes. However, embodiments of the present invention are not so limited. For example, in one embodiment, the standard DCC bytes can be employed for the transmission of the OAM&P information for the number of different network elements across a number of network rings, as illustrated in embodiments of the present invention. Moreover, in an embodiment, the additional DCC bytes can be employed for the transmission of the OAM&P information for the number of different network elements across a number of network rings, as illustrated in embodiments of the present invention, without performing any type of checking, as described above.

ALTERNATIVE EMBODIMENTS

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
a single multiplexing network element including,
   a plurality of slots to be coupled to optical fiber of multiple TDM rings through line cards installed in said slots,
   a multiple ring unit to simultaneously support multiple TDM rings, and
   a full TDM cross-connect coupled to each of said slots with the same amount of high-speed bandwidth, wherein said full cross-connect is programmable to switch time slots between the different TDM rings, wherein
      a first number of the line cards in said slots are to be coupled to customer premise equipment to form TDM access rings,
      a second number of the line cards in said slots are to be coupled to network elements to form collector rings, and
      wherein the first number is larger than the second number.

2. The apparatus of claim 1, wherein a line card with multiple ports can be installed in any one of said plurality of slots.

3. The apparatus of claim 1, wherein the amount of high-speed bandwidth is OC-48.

4. The apparatus of claim 1, wherein said plurality of slots number greater than 6.

5. The apparatus of claim 1, wherein said multiple ring unit includes:
a protection group manager structure of which an instance is formed for each ring provisioned in said single network element, said protection group manager structure including,
   a ring ID to distinguish between the different rings simultaneously provisioned in said single network element, and
   a ring map.

6. The apparatus of claim 5, wherein said protection group manager structure further includes:
an east and west protection unit to identify ones of said plurality of slots coupled to a given TDM ring, as well as ports on line cards inserted in those slots coupled to the given TDM ring.

7. The apparatus of claim 1, wherein said multiple ring unit includes:
a line card manager structure of which an instance is created for each line card inserted in said plurality of slots;
a port manager structure of which an instance is created for each port of each line card inserted in said plurality of slots;
a multi-ring manager structure to store identification information regarding each ring provisioned in said single network element;
a protection group manager structure of which an instance is created for each ring provisioned in said single network element; and
a network management system interface to be coupled to instances of said line card manager, said port manager, said multi-ring manager, and said protection group manager structures.

8. The apparatus of claim 7, wherein said protection group manager structure includes:
a ring ID to distinguish between the different rings simultaneously provisioned in said single network element, and
a ring map.

9. An apparatus comprising:
a network element in a hubbed network office, said network element including,
   a plurality of line cards, wherein optical fiber from two different rings is directly coupled to said network element through one or more of said plurality of line cards, wherein one of said rings includes other network elements which are coupled to customer premise equipment by TDM access rings of which that customer premise equipment is a part;
   a multiple ring unit to simultaneously support the two different rings, and
   a full TDM cross-connect coupled to each of said line cards with the same amount of high-speed bandwidth, wherein said full cross-connect is programmable on an STS-1 basis and is programmed to switch certain time slots between the two different rings.

10. The apparatus of claim 9, wherein one of said rings is a TDM collector ring.

11. The apparatus of claim 10, wherein another of said rings is a TDM collector ring.

12. The apparatus of claim 10, wherein another of said rings is a WDM or DWDM ring.

13. The apparatus of claim 9, wherein said two rings are a metro collector ring and a metro core ring.

14. The apparatus of claim 9, wherein at least one of said plurality of line cards includes multiple ports.

15. The apparatus of claim 9, wherein the amount of high-speed bandwidth is OC-48.

16. The apparatus of claim 9, wherein said plurality of line cards number greater than 6.

17. The apparatus of claim 9, wherein said multiple ring unit includes:
a protection group manager for each of said rings, each of said protection group managers including,
   a ring ID to distinguish between the two different rings, and
   a ring map.

18. The apparatus of claim 17, wherein each of said protection group managers further includes:
an east and west protection unit to identify those of said plurality of line cards coupled to that protection group manager's one of the two different rings, as well as the ports on those line cards coupled to that ring.

19. The apparatus of claim 9, wherein said multiple ring unit includes:
a line card manager for each of said plurality of line cards;
a port manager for each port on said plurality of line cards;
a multi-ring manager to store identification information regarding the two different rings;
a protection group manager for each of the two different rings; and
a network management system interface coupled to each of said line card managers, said port managers, said multi-ring manager, and said protection group managers.

20. The apparatus of claim 19, wherein each of said protection group managers includes:
- a ring ID to distinguish between the two different rings, and
- a ring map.

21. An apparatus comprising:
a single network element including,
- a plurality of multi-purpose slots into which are inserted line cards, those of said multi-purpose slots acting as aggregation interfaces are coupled to a ring, and those of said multi-purpose slots acting as access interfaces are coupled to customer premise equipment with TDM access rings; and
- a full TDM cross-connect coupled to each of said plurality of multi-purpose slots with the same amount of bandwidth, wherein the sum of the bandwidth to the access interfaces is greater than the sum of the bandwidth to the aggregation interfaces, and wherein said full TDM cross-connect is programmed to groom traffic on said access interfaces to said aggregation interfaces.

22. The apparatus of claim 21, wherein one of said access interfaces includes a line card with a plurality of ports.

23. The apparatus of claim 21, wherein the bandwidth of said plurality of TDM access rings is greater than the bandwidth of said ring.

24. The apparatus of claim 23, wherein the actual traffic on said plurality of TDM access rings is less than the bandwidth of said ring.

25. The apparatus of claim 23, wherein said single network element further includes:
- a protection group manager for each of said rings, each of said protection group managers including,
  - a ring ID to distinguish between the different rings, and
  - a ring map.

26. The apparatus of claim 25, wherein each of said protection group managers further includes:
- an east and west protection unit to identify those of said line cards that are coupled to that protection group manager's ring, as well as the ports on those line cards coupled to that ring.

27. The apparatus of claim 23, wherein said single network element further includes:
- a line card manager for each line card in said plurality of multi-purpose slots;
- a port manager for each port of said line cards;
- a multi-ring manager to store identification information regarding the two different rings;
- a protection group manager for each of the rings; and
- a network management system interface coupled to each of said line card managers, said port managers, said multi-ring manager, and said protection group managers.

28. The apparatus of claim 27, wherein each of said protection group managers includes:
- a ring ID to distinguish between the rings, and
- a ring map.

29. The apparatus of claim 21, said ring is a WDM or DWDM ring.

30. The apparatus of claim 21, said ring is a TDM collector ring.

31. The apparatus of claim 21, wherein the same amount of bandwidth is OC-48.

32. The apparatus of claim 21, wherein said plurality of multi-purpose slots number greater than 6.

33. An apparatus comprising:
a single network element including,
- a set of one or more line cards coupled to one or more network trunks, wherein all network trunks coupled to the single network element are coupled to the set of line cards,
- a plurality of line cards coupled to a plurality of sets of one or more pieces of customer premises equipment,
- a full cross connect coupled to each of said set of line cards and said plurality of line cards, wherein the sum of the bandwidth between said full cross connect and said plurality of line cards is greater than the sum of the bandwidth between said full cross connect and the set of line cards, wherein the bandwidth from said full cross-connect to at least certain ones of said plurality of line cards is only partially used, and wherein said full cross-connect multiplexes the used bandwidth of said plurality of line cards to said set of line cards.

34. The apparatus of claim 33, wherein one of said plurality of line cards has a plurality of ports.

35. The apparatus of claim 34, wherein one of said plurality of sets of one or more pieces of customer premises equipment is coupled to said single network element using a TDM access ring.

36. The apparatus of claim 34, wherein said plurality of line cards are coupled to said customer premise equipment with TDM access rings, wherein said network trunk is a TDM collector ring, and wherein the sum of the bandwidth of said plurality of TDM access rings is greater than the bandwidth of said TDM collector ring.

37. The apparatus of claim 36, wherein said single network element further includes:
- a protection group manager for each of said rings, each of said protection group managers including,
  - a ring ID to distinguish between the different rings, and
  - a ring map.

38. The apparatus of claim 37, wherein each of said protection group managers further includes:
- an east and west protection unit to identify those of said line cards that are coupled to that protection group manager's ring, as well as the ports on those line cards coupled to that ring.

39. The apparatus of claim 36, wherein said single network element further includes:
- a line card manager for each of said line cards;
- a port manager for each port on said line cards;
- a multi-ring manager to store identification information regarding the different rings;
- a protection group manager for each of the rings; and
- a network management system interface coupled to each of said line card managers, said port managers, said multi-ring manager, and said protection group managers.

40. The apparatus of claim 39, wherein each of said protection group managers includes:
- a ring ID to distinguish between the rings, and
- a ring map.

41. The apparatus of claim 34, said network trunk is a WDM or DWDM ring.

42. The apparatus of claim 41, wherein said single network element further includes:
- a multiple ring unit that allows for multiple TDM rings to be coupled to said single network element simultaneous.

43. The apparatus of claim 42, wherein said plurality of line cards are coupled to said customer premise equipment through multiple TDM access rings.

44. The apparatus of claim 34, wherein the same bandwidth is OC-48.

45. The apparatus of claim 34, wherein said full cross-connect is coupled to each of said line cards with the same amount of high-speed bandwidth.

46. An apparatus comprising:
   a first and second network element each including,
      a full TDM cross-connect coupled to every line card slot in said network element with the same amount of bandwidth connection, wherein said full TDM cross-connect is programmable on an STS-1 basis,
      a multiple ring unit simultaneously supporting multiple TDM rings, and
   a plurality of TDM access rings coupled to line cards inserted in said line card slots of said first network element to connect different pieces of customer premise equipment;
   said first and second network elements coupled to a first TDM collector ring through line cards inserted in said line card slots, wherein the sum of the bandwidth of the plurality of TDM access rings in the first network element is greater than the bandwidth of the first TDM collector ring;
   a second ring coupled to line cards inserted in said line card slots of said second network element.

47. The apparatus of claim 46, wherein said second ring is another TDM collector ring.

48. The apparatus of claim 47, wherein said second ring is a WDM or DWDM ring.

49. The apparatus of claim 48, wherein said full TDM cross-connect in said first network element is programmed to groom traffic on said plurality of TDM access rings to said first TDM collector ring.

50. The apparatus of claim 46, wherein each of said first and second network elements further includes:
   a protection group manager for each of ring provisioned in that network element, each of said protection group managers including,
      a ring ID to distinguish between the different rings provision in that network element, and
      a ring map.

51. The apparatus of claim 50, wherein each of said protection group managers further includes:
   an east and west protection unit to identify those of said line cards in that network element that are coupled to that protection group manager's ring, as well as the ports on those line cards coupled to that ring.

52. The apparatus of claim 49, wherein each of said first and second network elements further includes:
   a line card manager for each of said line cards in that network element;
   a port manager for each port on said line cards in that network element;
   a multi-ring manager to store identification information regarding the different rings provisioned in that network element;
   a protection group manager for each of the rings provisioned in that network element; and
   a network management system interface coupled to each of said line card managers, said port managers, said multi-ring manager, and said protection group managers.

53. The apparatus of claim 52, wherein each of said protection group managers includes:
   a ring ID to distinguish between the rings provisioned in that network elements and
   a ring map.

* * * * *